United States Patent [19]
Kang et al.

[11] Patent Number: 5,896,571
[45] Date of Patent: Apr. 20, 1999

[54] SWITCH CONTROL METHOD FOR DUAL TONE MULTI-FREQUENCY SERVICE OF MSC

[75] Inventors: Sook-Yang Kang; Dae-Sik Kim, both of Daejeon, Rep. of Korea

[73] Assignee: Electronics and Telecommunications Research Institute, Daejeon, Rep. of Korea

[21] Appl. No.: 08/670,788

[22] Filed: Jun. 24, 1996

[30] Foreign Application Priority Data

Jun. 23, 1995 [KR] Rep. of Korea .................. 95-17185

[51] Int. Cl.$^6$ .................................................. H04Q 7/20
[52] U.S. Cl. .................................. 455/445; 455/560
[58] Field of Search .............................. 455/433, 414, 455/403, 417, 436, 432, 434; 370/335

[56] References Cited

U.S. PATENT DOCUMENTS

| | | | |
|---|---|---|---|
| 4,866,759 | 9/1989 | Riskin | 379/906 |
| 4,922,528 | 5/1990 | Hubert et al. | 379/386 |
| 5,140,627 | 8/1992 | Dahlin | 455/436 |
| 5,610,972 | 3/1997 | Emery | 455/433 |

*Primary Examiner*—Edward F. Urban
*Assistant Examiner*—Tilahun Gesesse
*Attorney, Agent, or Firm*—Antonelli, Terry, Stout & Kraus, LLP

[57] ABSTRACT

A switch control method for DTMF service in a mobile switching center, is disclosed including the steps of (a) calling an ARS service system in a mobile station receiving, by a switch controller of an mobile exchange, a switch connection request for DTMF service input through a call controller of the mobile exchange through a base station if DTMF service is requested from the mobile station allocating a channel, requesting connection a lower-order processor; and sending a response after connection to the mobile station; and (b) receiving and processing a switch release request input to the call controller through the mobile station during communication after the step (a).

5 Claims, 5 Drawing Sheets

SWITCH CONTROL METHOD FOR DUAL TONE MULTI-FREQUENCY SERVICE OF MSC

BACKGROUND OF THE INVENTION

The present invention relates to a switch control method for dual tone multi-frequency (DTMF) service of a mobile switching center (MSC), in which a number connected to an automatic recording service (ARS) system is dialed to push a corresponding service code so that a mobile subscriber receives information from the ARS system.

In the conventional public switched telephone network (PSTN) or integrated service digital network (ISDN), the coding of voice and tone is performed in a pulse code modulation (PCM) mode in which sampling is carried out at 8 kHz and the bit rate is above 64 kbps so that the DTMF tone from a terminal can be transmitted directly to the counterpart.

For prior art related with the conventional DTMF device, there is suggested U.S. Pat. No. 4,922,528 entitled "Dual tone multi-frequency signal recognizer for telephone mobile exchange". This disclosure uses several bandpass filters corresponding to the respective numbers as a signal detecting circuit. The respective output signals are compared with one output signal within two frequency domains. This technology enables detection of vocal signal frequency to become reliable.

There is also presented U.S. Pat. No. 4,856,759 entitled "Identifying words entered on dual tone multi-frequency". In this reference the discrimination of words entering the DTMF push button is decided in two or three frequency groups.

As mentioned above, in the DTMF service of PSTN, the DTMF frequency is transmitted through a DTMF telephone while the communication path is connected, and the counterpart mobile exchange recognizes the frequency. The ARS is provided by sending the frequency offered from the terminal through the communication path.

However, in a mobile station transmission is performed in the form of not frequency but message passing through a base station and mobile exchange from the terminal so that corresponding frequencies to numbers pushed by the subscriber must be transmitted from the mobile exchange. For this reason, in the mobile exchange, the device for DTMF transmission must be connected, which may affect the communication path when DTMF or new service is provided to the mobile subscriber. In other words, in the CDMA mobile communication system, coding is differentiated with the bit rates of 9.6 kbps, 4.8 kbps and 1.2 kbps, and these sampling rates prevent the DTMF tone from being transmitted directly. This requires DTMF switch connection and release from the subscriber control block.

SUMMARY OF THE INVENTION

It is an object of the present invention to provide a switch control method for DTMF service in a mobile communication mobile exchange, which enables a mobile subscriber to receive information from the ARS system.

In this invention, DTMF or new service is offered to the mobile subscriber, not affecting the receiving communication path but minimizing its effect on the calling communication path.

To accomplish the objects of the present invention, there is provided a switch control method for DTMF, service in a mobile switching center, comprising the steps of: (a) calling an ARS service system in a mobile station, receiving, by a switch controller of a mobile exchange, a switch connection request for DTMF service input through a call controller of the mobile exchange through a base station if DTMF service is requested from the mobile station, allocating a channel, requesting connection of a lower-order processor and sending a response after connection to the mobile station; and (b) receiving and processing a switch release request input to the call controller through the mobile station during communication after the step (a).

BRIEF DESCRIPTION OF THE ATTACHED DRAWINGS

DETAILED DESCRIPTION OF PREFERRED EMBODIMENT

Hereinafter, a preferred embodiment of the present invention will be described with reference to the attached drawings.

Figure 1:
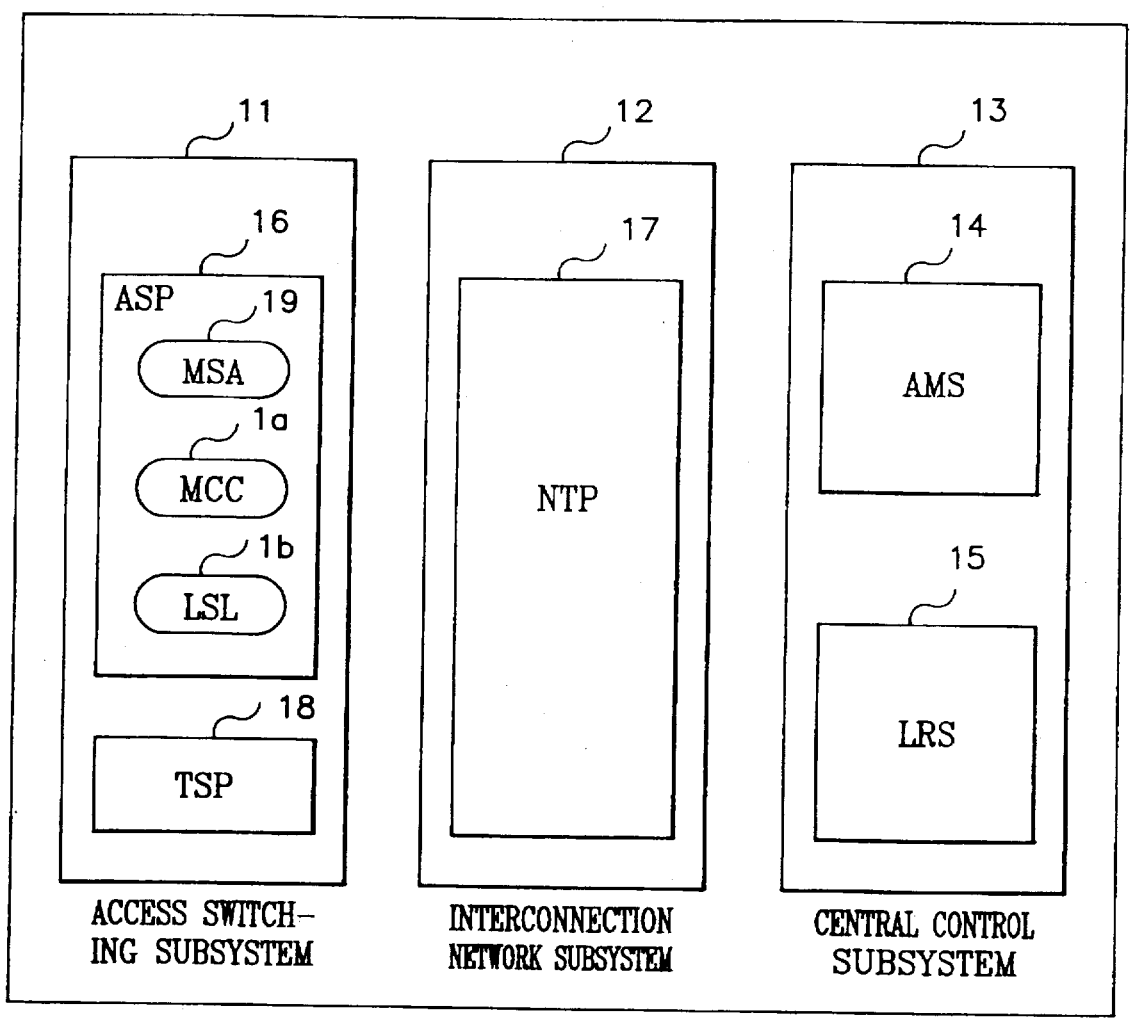
FIG. 1 is a block diagram of a mobile communication switching system to which the present invention will be applied.

As shown in FIG. 1, a mobile communication exchange (for instance TDX-10MX) to which the present invention will be applied is made up of three subsystems such as access switching subsystem (AST) 11, interconnection network subsystem (INS) 12, and central control subsystem (CCS) 13. The operation of the mobile communication exchange will be explained as follows.

First of all, AST 11 is comprised of a subscriber trunk line matching device, time switch and various signal devices in order to perform call processing. INS 12 is placed at the center of the system in order to perform space switching for connecting AST 11, and to perform number translation.

CCS 13 is divided into administration and maintenance subsystem (AMS) 14 and location register subsystem (LRS) 15. AMS 14 performs management and maintenance of system, fee charging, and management of hard disk and input/output devices. LRS 15 is a subsystem additionally installed to the mobile communication system in order to manage the position registration and information of the subscriber.

Access switching processor (AST) 16 included in ASS 11 has a mobile subscriber signaling access (MSA) 19 which serves a signal interface between a base station and mobile exchange and performs conversion to mobile exchange message.

Mobile call control (MCC) 1a receives the message from MSA 19 to establish a call path, and controls the call until the subscriber releases it via the subscriber call received.

LSL 1b manages all switch-related channels and the state of device, and processes the allocation and release of the channels. Time switch processor (TSP) 18 performs substantial connection and release for the channel requested by LSL 16. Number translation processor (NTP) 17 included in INS 12 performs number translation, and called subscriber paging. Location register subsystem (LRS) 15 manages and stores data for the position register.

This invention is included in AST 11 of the three subsystems, arid applied to LSL 1b for managing the switch channels and device state, and processing channel allocation and release.

Figure 2:
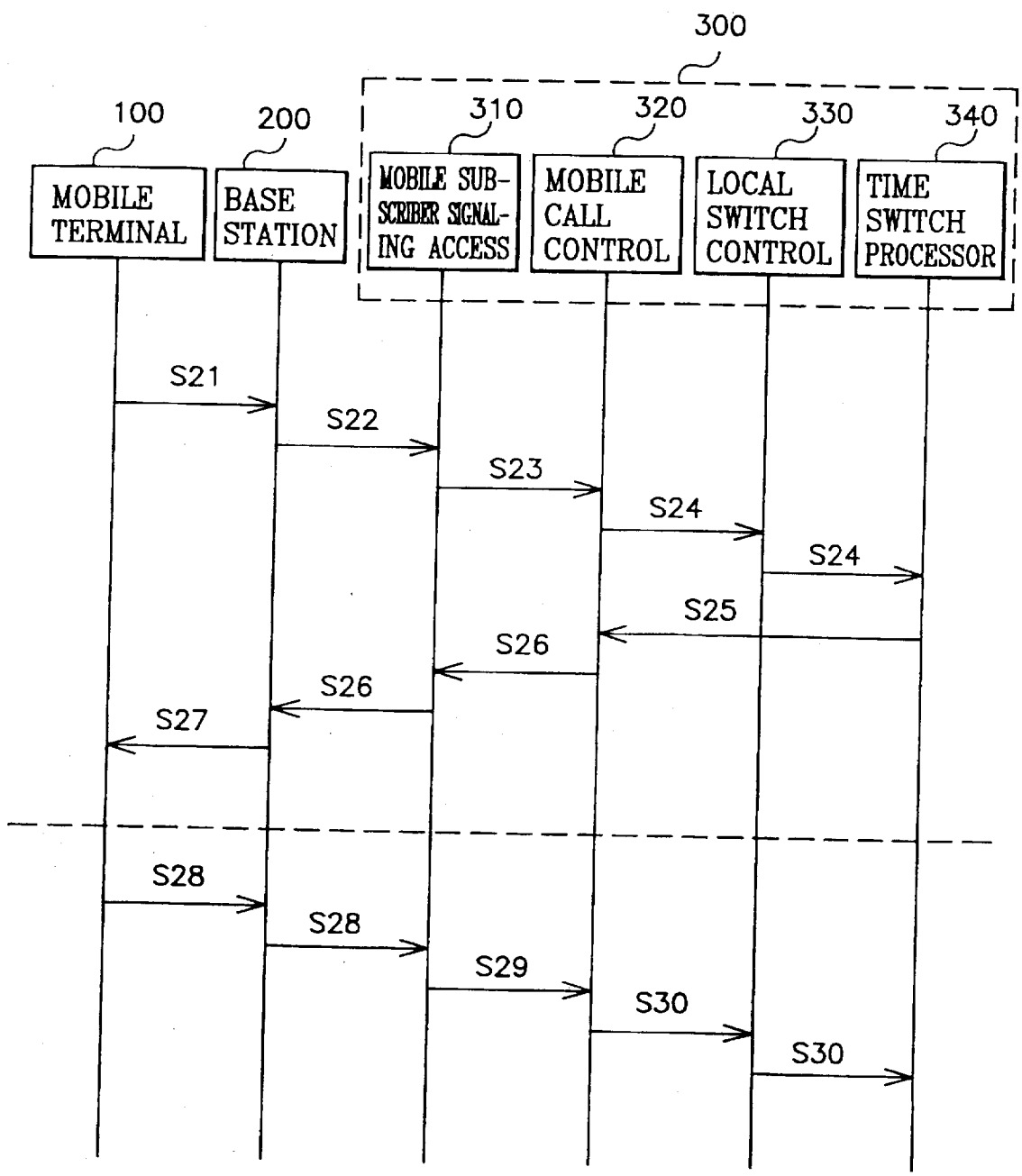
FIG. 2 is a call flowchart by the request for DTMF service.

Referring to FIG. 2, there are two types of DTMF: one is a continuous DTMF for transmitting one digit according to the form of message; the other is a burst DTMF in which several digits are transmitted together for the length of the message. For the respective types of DTMF the message is different and the form of processing call is slightly different as well.

The mobile subscriber calls the receiving number of the mobile exchange which offers ARS The counterpart mobile exchange transmits guide broadcasting for corresponding service. The subscriber pushes digits according to the guide broadcasting. If mobile terminal 100 requests DTMF service during communication in step S21, this request is transmitted to mobile exchange 300 via base station 200 in step S22.

The DTMF service request transmitted from base station 200 is sent to MCC 320 for controlling a call through MSA 310. MCC 320 transmits the DTMF service request message to LSC 330, and requests switch connection for the DTMF service in step S23. LSC 330 which receives the switch connection request allocates corresponding channels, and requests connection of TSP 340, one of lower-order processors, in step S24 After connection, TSP 340 transmits the response to MCC 320, one of the higher-order processors, in step S25. Mobile exchange 300 responds to base station 200 in step S26, and transmits a corresponding response DTMF message to mobile station 100 from base station 200.

If a stop DTMF message comes after the continuous DTMF message and H'FF is received indicative of an end digit, device connection is released. Also for a burst DTMF message, a release request is processed after the connection request.

Meanwhile, if the DTMF service release request co omes from mobile station 100 in step S28, this release request is transmitted to MCC 320 via base station 200 and MSA 310 mobile exchange 300 in step S29. MCC 320 requests switch release in step S30, and requests release of TSP 340 in step S30.

LSC 330 receives the switch connection request input from MCC 320 to allocate channels and connects the switch, and receives the switch release request to release the switch. The switching control method of LSC 330 will be explained below with reference to FIG. 3.

The switch controlling method includes the steps of (a) receiving and processing the switch connection request and of (b) receiving and processing the switch release request. Step (a) includes the steps of (S31) receiving and processing the DTMF service request (switch connection request) from MCC 320, (S32) selecting a front-stage junctor for connecting to the device according to DTMF service request in step S31, (S33) selecting a device channel for DTMF transmission after junctor selection in step S32, and (S34) requesting switch connection and device connection to the lower-order processor corresponding to the channel allocated by the device channel selection in step S33. In the switch connection request processing step, if the switch connection request for providing DTMF service is received from MCC 320 in step S31, the front-stage junctor to be connected to the rear stage of switch is selected in step S32.

At the same time, after the device channel for DTMF transmission is selected in step S33, the switch connection and device connection request is performed in step S34 to the lower-order processor corresponding to the channel allocated by the selection.

The switch release request processing step includes the steps of (S35) receiving and processing the release request from MCC 320 if the subscriber ends the DTMF service through mobile station 100, in other words, if there is a switch connection release request, (S36) releasing the front-stage junctor selected corresponding to release request in step S35, (S37) releasing the allocated device channel, and (S38) requesting the release of the connected switch and device to the lower-order processor.

In the switch release request processing step, if the mobile subscriber request DTMF service ends through mobile station 100 and receives a release request, that is, DTMF channel cutting request, from MCC 320 in step S35, the front-stage junctor is released in step 536, the device is released in step S37, and this release information is transmitted to the lower-order processor so as to cut the switch and device in step S38.

Figure 4:
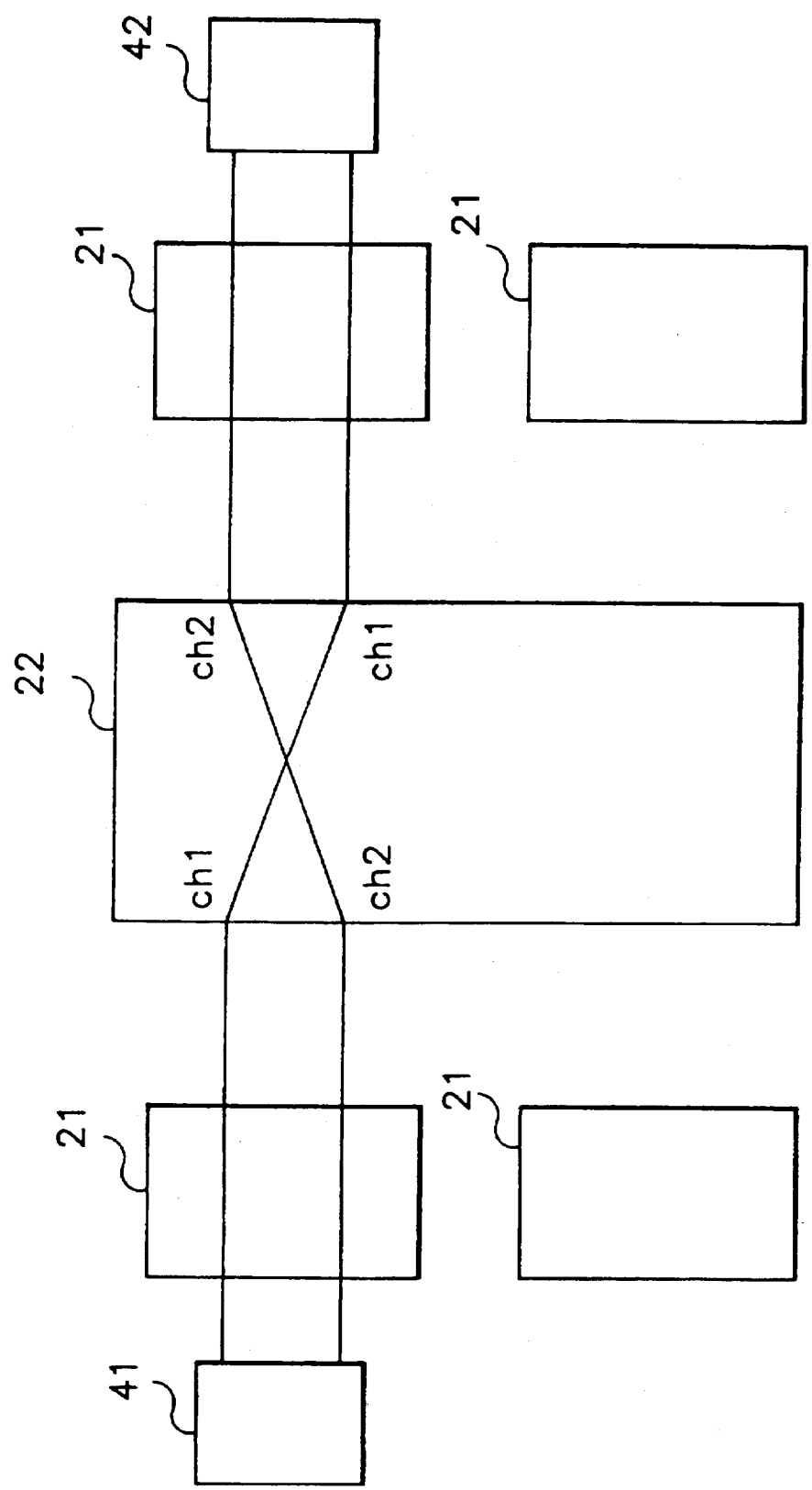
FIG. 4 is a connection structure of a switch during normal call procedure.

Referring to FIG. 4 a call is made between the calling subscriber and called subscriber. Here, the call connects the time slot 41 of the calling subscriber and the time slot 42 of the called subscriber. If there is no ARS system in the mobile communication system, an ARS service provider of another network is connected.

For such call processing, two channels ch1 and ch2 are used inside INS 22 having information input/output via AST 21' connected to the time slot 41 of the calling subscriber and AST 21 connected to the time slot 42 of the calling subscriber.

Figure 3:
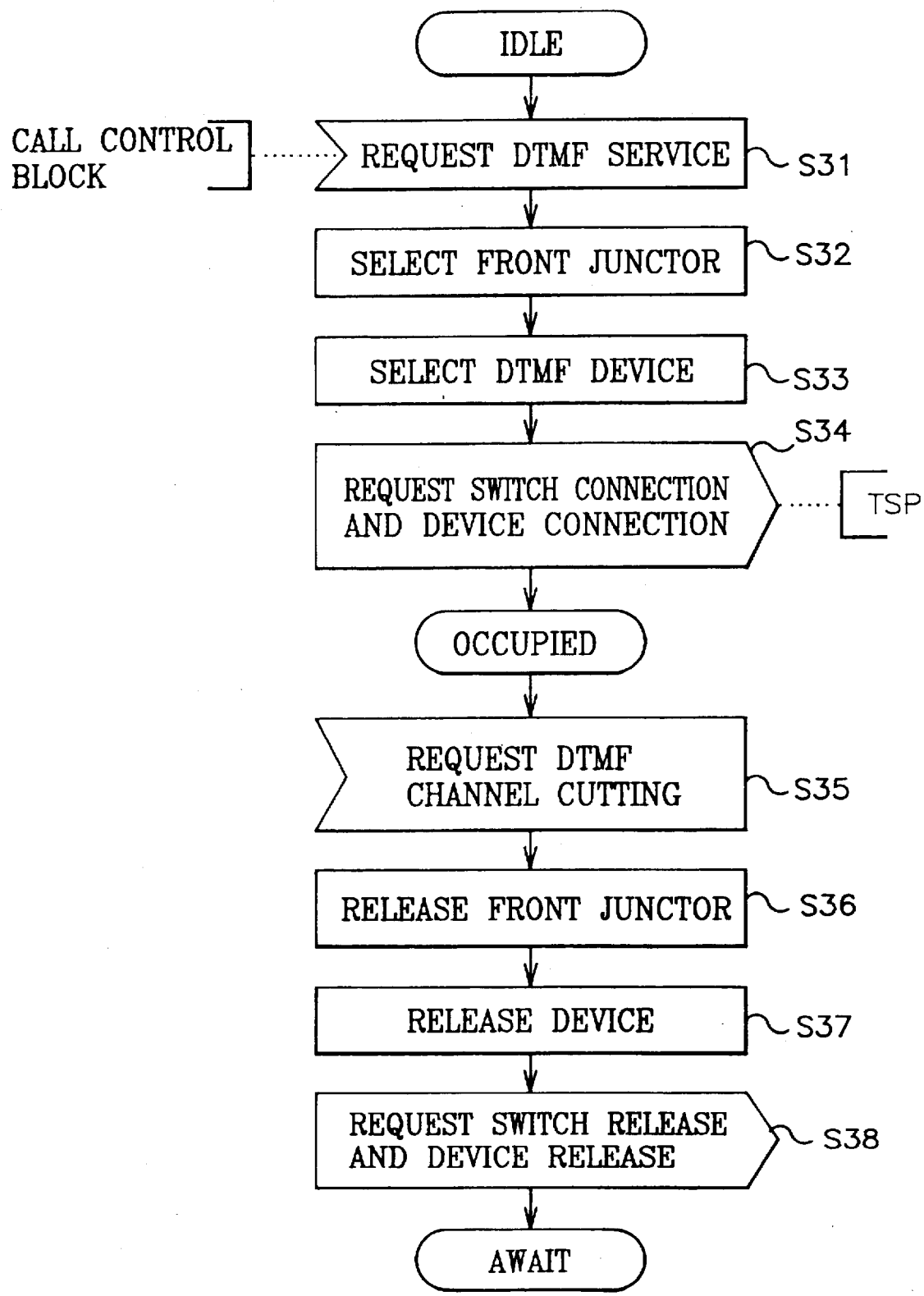
FIG. 3 is a flowchart for connecting and releasing a switch at the request for DTMF service.
Figure 5:
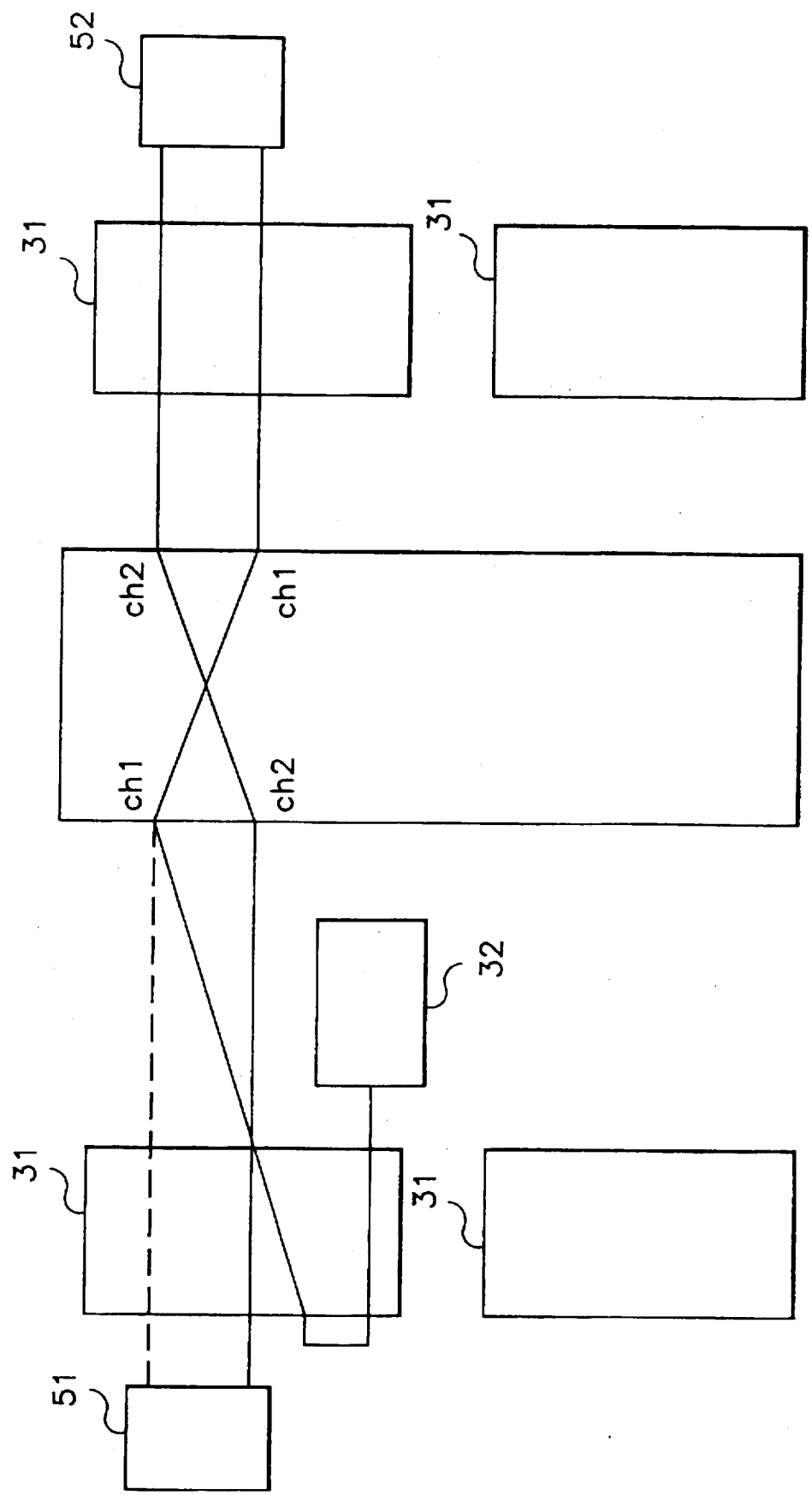
FIG. 5 is a connection structure of switch during DTMF service processing.

Referring to FIG. 5, if the DTMF connection request is received, the front-stage junctor shown in FIG. 3 is selected in step S32 to hold other time slot and DTMF channel 54 at the same time.

In this state, the previously connected switch is maintained, and switch over is produced with the new time slot. Previously time slot 51 was connected to channel ch1 inside INS 32 through ASS 31, but the other time slot must be connected thereto.

Meanwhile, there is no change for the channel of the rest time slot 52. In other words, when the DTMF service request is received, the previous switch channel for switch connection and release processing is maintained, and the channel connected to the device is connected.

As described above, the present invention processes all of the switch controls at the calling side and uses the front-stage junctor so that the rear stage of switch is processed regardless of service. Therefore, the effective resource of the calling side is used, and service is provided regardless of the calling side's switch connection and release until the call is completely released with the called side's switch. connected.

In short, the present invention deals with a method of connecting a switch for using DTMF transmitter which is an internal resource of the mobile exchange, when ARS service is provided to the mobile subscriber. For this reason, the resource (DTMF channel) placed in the mobile subscriber module is utilized and saves the resource placed in the trunk line directed to another network. At the same time, there is nearly no effect on the existing communication path, which eliminates any inconvenience possibly felt by the subscriber during communication.

Although the present invention has been described above with reference to the preferred embodiments thereof, those skilled in the art will readily appreciate that various modifications and substitutions can be made thereto without departing from the spirit and scope of the invention as set forth in the appended claims.

What is claimed is:

1. A switch control method for dual tone multi-frequency (DTMF) service in a mobile switching center, said method comprising the steps of:

(a) calling an automatic recording service (ARS) system in a mobile station;

(b) receiving, through a switch controller of a mobile exchange, a switch connection request for DTMF service input through a call controller of the mobile exchange through a base station if DTMF service is requested from said mobile terminal;

(c) allocating a DTMF device;

(d) requesting connection of said DTMF device to a lower-order processor;

(e) sending a response after connection to said mobile terminal;

(f) receiving and processing a switch release request input to said call controller through said mobile terminal during communication; and connecting an existing channel between said mobile station and said base station to said DTMF device.

2. The method as claimed in claim 1, wherein said steps (a)–(e) comprise the sub-steps of:

(i) receiving and processing the DTMF service request from said call controller;

(ii) selecting a front-stage junctor for connecting to the device according to the DTMF service request in said sub-step (i);

(iii) selecting a device channel for DTMF transmission after junctor selection in said sub-step (ii); and (iv) requesting switch connection and device connection to the lower-order processor corresponding to the channel allocated by the device channel selection in said sub-step (iii).

3. The method as claimed in claim 1, wherein said step (f) comprises the sub-steps of:

(v) receiving and processing a release request from said call controller;

(vi) releasing the front-stage junctor selected corresponding to the release request in said sub-step (v);

(vii) releasing the allocated device channel; and (viii) requesting the release of the connected switch and device to the lower-order processor.

4. The method as claimed in claim 1, wherein two internal channels are used during normal call procedure to connect a calling subscriber's time slot and a called subscriber's time slot, and if there is no ARS system in a corresponding mobile communication system, an ARS service provider of another network is connected.

5. The method as claimed in claim 1, wherein during DTMF service processing, switch control is processed on a calling side so as to use a DTMF transmitter inside the mobile exchange, and switch connection is maintained using the front-stage junctor with the rear stage of switch being independent of service.

* * * * *